Patented Nov. 19, 1940

2,221,819

UNITED STATES PATENT OFFICE 2,221,819

HYDROCARBON SUBSTITUTED PHENO-THIOXINE COMPOUNDS

Frank B. Smith and Harold W. Moll, Midland, Mich., assignors to The Dow Chemical Company, Midland, Mich., a corporation of Michigan No Drawing. Application May 10, 1939,
Serial No. 272,816

6 Claims. (Cl. 260—327)

This invention relates to derivatives of phenothioxine and is particularly concerned with hydrocarbon substituted phenothioxine compounds having the formula

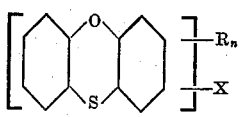

wherein R represents phenyl or an alkyl radical containing from 2 to 8 carbon atoms, inclusive, X represents halogen or hydrogen, and $n$ is an integer, and a method for preparing the alkyl phenothioxine compounds.

We have prepared a number of compounds falling within the scope of the foregoing formula and found them to be useful as modifiers in plastic compositions, as intermediates, as insecticidal toxicants, as antioxidants, and as rubber and gum inhibitors.

The above alkyl phenothioxine compounds may be prepared by reacting phenothioxine or halophenothioxine with an olefin in the presence of an acid activated bleaching earth as a catalyst, and under such conditions of temperature and pressure as favorably influence the introduction of one or more alkyl radicals in one or both of the phenyl nuclei of the phenothioxine group. In carrying out the reaction any suitable amounts of phenothioxine or halo-phenothioxine and olefin may be heated together in the presence of the catalyst to obtain the desired compounds, a mixture of mono- and poly-alkylated products being obtained regardless of the proportions employed. We frequently employ from 0.3–5 molar equivalents of the olefin alkylating agent per mole of phenothioxine compound. The temperature required to cause reaction is generally between about 175° and 300° C., although somewhat lower temperatures may sometimes be employed. One method of precedure consists of mixing together phenothioxine, for example, catalyst, and olefin in a pressure reactor and thereafter heating and agitating the mixture under autogenous pressure until the desired degree of reaction is obtained. The reactor and contents are then cooled, unreacted olefin material vented, the product filtered to remove catalyst, and the filtrate fractionally distilled under reduced pressure to separate the desired alkylated compounds. If desired, the crude reaction mixture may be employed in various ways, for example, as a raw material for the preparation of more complicated compounds adapted to be employed as insecticidal toxicants, or as a modifying agent in plastic compositions.

An alternate method, and one by which both alkyl and phenyl phenothioxine compounds may be prepared, consists of reacting an alkyl or phenyl substituted diphenyl or mono-halo-diphenyl ether with sulphur in the presence of anhydrous aluminum chloride. In carrying out this reaction, the diphenyl ether compound and sulphur are mixed together, heated to a temperature of between about 80° and about 120° C., and the aluminum chloride catalyst added thereto. Heating is continued until the reaction is complete, after which the mixture is poured into water or aqueous acid, and the crude reaction product separated and fractionally distilled, or crystallized out of organic solvents.

The following examples illustrate certain embodiments of our invention with respect to the preparation of phenyl and alkyl substituted phenothioxine compounds, but are not to be construed as limiting.

Example 1

192 grams of sulphur and 960 grams of 2-xenylphenyl ether were mixed together and heated to a temperature of 90° C. 76 grams of anhydrous aluminum chloride was then added portion-wise to the mixture with stirring over a period of 5 hours and at temperatures gradually increasing to 100° C. Following the aluminum chloride addition, heating and stirring were continued for 7 hours, at the end of which time the reaction mixture was stirred into an excess of aqueous hydrochloric acid to quench the aluminum chloride catalyst and separate the desired phenothioxine compound. The crude product was separated by decantation, washed with water, and fractionally distilled whereby there was obtained 398 grams of 1-phenyl phenothioxine as a solid boiling at 203°–210° C. at 5 millimeters pressure. This product was recrystallized from normal butyl alcohol to obtain white crystals melting at 70.5°–71.5° C.

Example 2

1000 grams (5 moles) of phenothioxine and 100 grams of a representative acid activated bleaching earth (Retrol) were mixed together in a pressure reactor. 140 grams (5 moles) of ethylene was introduced into the mixture and the latter heated to 240° C. for 29 hours under autogenous pressure, agitation being maintained throughout. The reactor and contents were then cooled, unreacted ethylene vented, and the crude product filtered to separate the bleaching earth catalyst. This filtered crude product was then fractionally distilled whereby there were obtained two diethyl phenothioxine fractions. The first boiled at 200°–215° C. at 20 millimeters pressure and had a specific gravity of 1.215 at 25°/25° C. The second fraction was somewhat more viscous and had a boiling range of 215°–226° C. at 20 millimeters pressure and a specific gravity of 1.177 at 25°/25° C. As a residue there was obtained an appreciable amount of a light brown resinous product consisting essentially of polyethyl phenothioxines, liquid at elevated temperatures, and boiling with decomposition at temperatures above 226° C. at 5 millimeters pressure.

A 3 per cent solution in a light petroleum distillate of the diethyl phenothioxine fraction boiling at 200°–215° C. at 20 millimeters pressure was tested according to the Peet Grady method substantially as described in Soap 8, No. 4, 1932 and found to give a 57 per cent knockdown in 10 minutes and 24 per cent kill in 24 hours of three-day old house flies.

*Example 3*

402 grams (1.54 moles) of propylene, 1000 grams (5 moles) of phenothioxine, and 100 grams of Retrol (bleaching earth catalyst) were reacted together substantially as described in Example 2 at a temperature of 250° C. for a period of 26 hours. At the end of this time the reaction mixture was cooled and 257 grams of unreacted propylene recovered. Upon filtration of the crude reaction mixture and fractional distillation of the filtrate, several propylated phenothioxine fractions were obtained. The first of these consisted essentially of mono-propyl phenothioxines, boiled at 200°–216° C. at 20 millimeters pressure, and had a specific gravity of 1.199 at 25°/25° C. The second fraction boiled at 216°–227° C. at 20 millimeters pressure had a specific gravity of 1.146 at 25°/25° C., and was a mixture of di-propyl phenothioxines. The third fraction was also mixed di-propyl phenothioxine, boiled at 226°–244° C. at 20 millimeters pressure, and had a specific gravity of 1.105 at 25°/25° C. A residual product boiled with some decomposition at temperatures above 244° C. at 20 millimeters pressure and was found by analysis to consist essentially of tetrapropyl phenothioxine.

A 3 per cent petroleum distillate solution of the third fraction, when tested according to the Peet Grady method as described in Example 2, gave a knockdown of 26 per cent in 10 minutes and a kill of 24 per cent of the test insects in 24 hours.

*Example 4*

In a similar manner 960 grams (17.1 moles) of 1-butylene, 100 grams (5 moles) of phenothioxine, and 100 grams of the bleaching earth catalyst were reacted together at 150° C. over a period of 7.5 hours to obtain as a crude reaction product a mixture of butylated phenothioxines. This crude mixture was fractionally distilled whereby there was obtained a mono-butyl phenothioxine fraction boiling at 245°–264° C. at 20 millimeters pressure and having a specific gravity of 1.134 at 25°/25° C. As a higher boiling fraction there was obtained a mixture of dibutyl phenothioxines boiling at 264°–280° C. at 20 millimeters pressure and having a specific gravity of 1.118 at 25°/25° C. The residue was a thick viscous liquid boiling with some decomposition above 280° C. at 20 millimeters pressure. This product upon analysis was found to consist of a mixture of tetra-, penta- and high butyl-phenothioxines.

A 3 per cent petroleum distillate solution of the monobutyl phenothioxine fraction gave a kill of 20 per cent in 24 hours when tested against three-day old house flies by the Peet Grady method.

By substituting other phenyl or alkyl substituted diphenyl ethers and mono-halo-diphenyl ethers for that shown in Example 1, other alkyl and phenyl phenothioxine compounds may be obtained. For example, such compounds as di-4-xenyl ether, mono-chloro-di-4-xenyl ether, mono-bromo-di-3-xenyl ether, 4-tertiary-octyl-diphenyl ether, tri-isopropyl-diphenyl ether, penta-ethyl-diphenyl ether, 4-tertiary-butyl-4'-chloro-diphenyl ether, and the like, may be reacted with sulphur in the presence of aluminum chloride to form 3.6-diphenyl phenothioxine, 3.6-diphenyl-mono-chloro phenothioxine, 3-tertiary-octyl phenothioxine, etc. Similarly such olefins as 2-butylene, iso-butylene, iso-amylene, normal hexene, di-isobutylene, and their homologs and isomers may be substituted for the ethylene, propylene, and butylene shown in Examples 2–4, inclusive. Likewise mono-bromo- or mono-chloro-phenothioxine may be substituted for pheno-thioxine in the alkylation reaction.

While certain of the foregoing examples have disclosed the use of "Retrol" as the catalytic agent, it is to be understood that the invention is in no sense limited to the use of this particular material as a catalyst. While "Retrol" is a representative acid activated bleaching earth, at the present time commercially available, other activated bleaching earth products may be similarly employed. Such materials are also commonly identified as surface-active siliceous clay catalysts.

Other modes of applying the principle of our invention may be employed instead of those explained, change being made as regards the materials employed, provided the steps of products set forth in the following claims be thereby followed or obtained.

We therefore particularly point out and distinctly claim as our invention:

1. In a method for the prepartion of alkyl phenothioxine compounds the step of mixing a member of the group consisting of phenothioxine and mono-halo phenothioxines with an olefin and heating the mixture in the presence of an acid activated bleaching earth.

2. In a method for the preparation of alkyl phenothioxines the step of heating a mixture of phenothioxine and olefin in the presence of an acid activated bleaching earth and under autogenous pressure.

3. In a method for the preparation of alkyl phenothioxines the steps of heating a mixture of phenothioxine and olefin in the presence of acid activated bleaching earth and under autogenous pressure, filtering the reaction mixture to remove the bleaching earth catalyst, and fractionally distilling the crude product.

4. In a method for the preparation of ethylated phenothioxines the step of heating a mixture of phenothioxine and ethylene in the presence of acid activated bleaching earth.

5. In a method for the preparation of propylated phenothioxines the step of heating a mixture of phenothioxine and propylene in the presence of acid activated bleaching earth.

6. In a method for the preparation of butylated phenothioxines the step of heating a mixture of phenothioxine and butylene in the presence of an acid activated bleaching earth.

FRANK B. SMITH.
HAROLD W. MOLL.